United States Patent Office 3,377,667
Patented Apr. 16, 1968

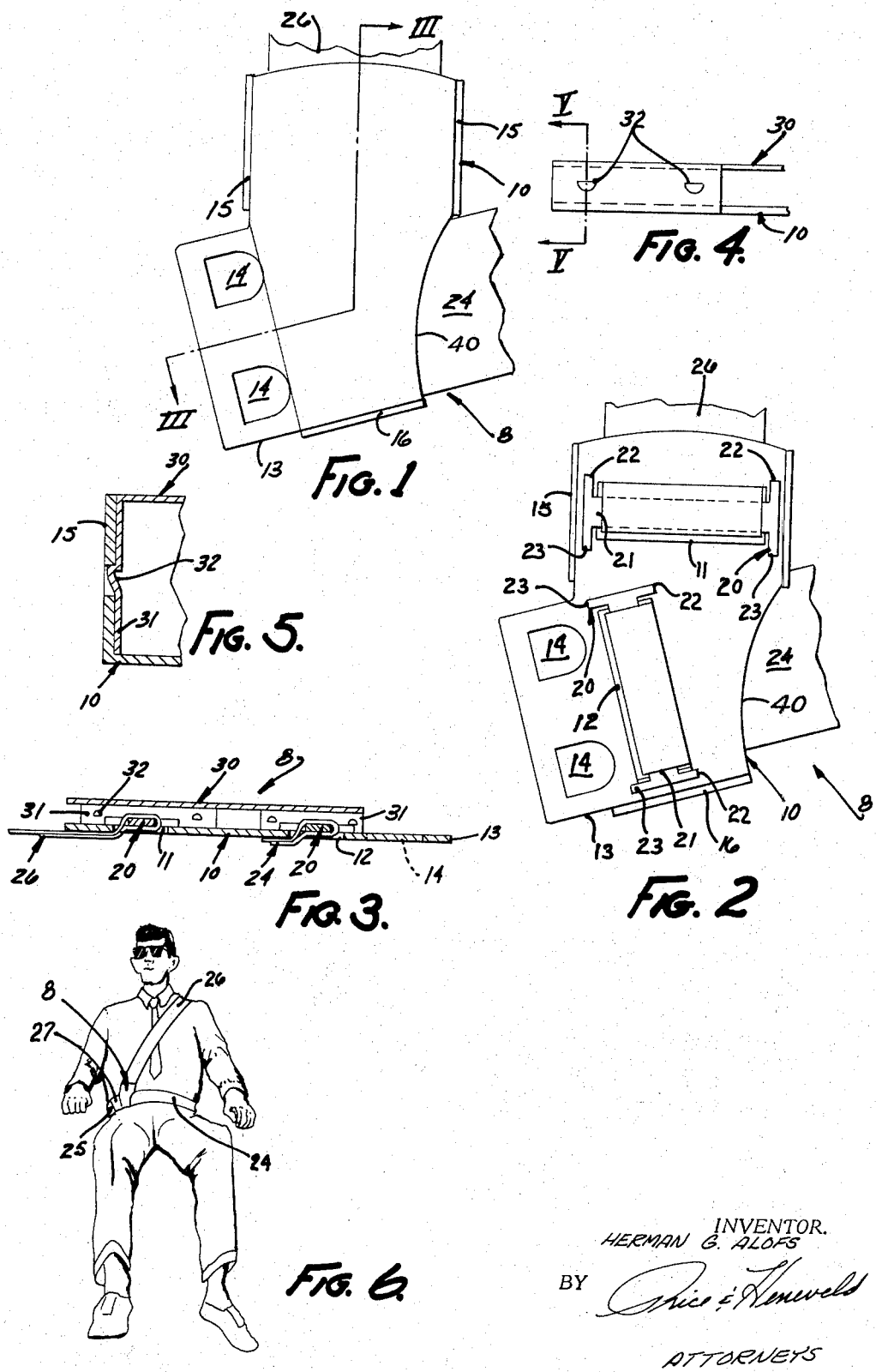

3,377,667
ADJUSTABLE BUCKLE FOR OVER-SHOULDER SAFETY BELTS
Herman G. Alofs, Grand Rapids, Mich., assignor to Alofs Manufacturing Company, Grand Rapids, Mich., a corporation of Michigan
Filed Apr. 18, 1966, Ser. No. 543,325
3 Claims. (Cl. 24—74)

ABSTRACT OF THE DISCLOSURE

A shoulder and seat belt anchoring structure having a base plate and a cover plate affixed thereto by interengaging flanges. The base plate has a buckle engaging keeper plate integrally formed therewith extending from beneath said cover plate. Also provided in the base plate is a first slot positioned perpendicular to the reach of said keeper plate and a second slot positioned at an angle with respect thereto. The slots in conjunction with suitable bars function to retain adjustably said seat and shoulder belts to said anchoring structure.

Background

This invention relates to an anchor plate or buckling devices for safety belts and, more particularly, to buckling devices particularly adapted for use with over-shoulder safety belts.

During the past few years the transportation industry has been devoting increasing attention to occupant safety. One of the major steps which has been taken is the provision of safety belts in automobiles, airplanes and other types of vehicles which will retain the occupant in a relatively stationary position with respect to the vehicle should an accident occur. Conventionally, safety belts consist of a pair of straps which pass around the occupant's waist or pelvic section and buckle in some convenient manner. The rear ends of the two straps are anchored to the vehicle in rigid fashion such that, when an impact occurs, the inertial force of the occupant's body will be transferred directly to the vehicle frame and the occupant will remain relatively stationary with respect thereto.

While safety belts of the type described have significantly reduced the number of deaths and serious injuries resulting from vehicle accidents, they have not proved entirely satisfactory for two distinct reasons. First, when forward impact is incurred the lap-type safety belts do not restrain the occupant's head and shoulders from swinging forward and striking dashboards, steering wheels and similar obstacles. Second, as the occupant's body inertia is transferred to the belt tremendous pressures are exerted in the waist region, sometimes resulting in spleen rupture and other internal injuries. In some cases the seriousness of these injuries exceeds that which would have been incurred had the occupant been wearing no safety belt at all.

To counteract these deficiencies, many safety engineers are now advocating the provision and usage of over-the-shoulder safety harnesses. As the name implies, these harnesses pass over the shoulder and thus prevent the occupant's head and shoulders from swinging forward during impact. Safety harnesses of this type additionally provide a greater bearing area on the occupant's body, and thus large inertial forces are not concentrated at a small area thereof during deceleration. It is fair to say that over-the-shoulder harnesses are widely accepted as being more efficient than the conventional safety belts which pass only around the rider or driver's mid-section. This is particularly true when they are utilized in conjunction with a conventional lap-type seat belt. With such an arrangement, the occupant's head and shoulders are restrained by the shoulder harness while lateral movement of the entire body and forward movement of the lower body section is restrained by the seat belt.

There is yet another aspect which must be considered in determining the over-all efficiency of any safety harness arrangement. This is perhaps the most vexatious problem encountered by safety engineers. It consists merely in an ascertainment of whether or not the occupant will put the particular harness on when he gets into his vehicle and, if he does so, whether or not he will adjust it properly such that it will operate at maximum efficiency should an accident occur. Obviously, safety harnesses do no good if they have not been put on and their efficiency is greatly reduced if they are not properly adjusted to the size of the person to be secured. It is highly desirable, therefore, that the safety harness arrangement be as easy as possible to put on and as easy as possible to adjust, thus encouraging its proper use during travel.

One of the primary problems in gaining public acceptance of over-the-shoulder safety harnesses, and thus in getting them installed as standard equipment in automobiles and other types of vehicles, is the relative complexity of prior art buckling and adjustment devices. That is to say, that it is generally a major undertaking to get the over-the-shoulder part of the harness in proper position, properly adjusted and get it fastened. Consequently, over-the-shoulder safety harnesses have not gained wide popularity and usage even though, as noted previously, it is virtually conceded that they afford a greater degree of protection than do conventional lap-type seat belts.

Objects and specification

It is an object of this invention to provide a single device serving as the keeper plate for both the lap and over-the-shoulder belts.

It is an object of this invention to provide an adjustable buckle for over-the-shoulder safety belts which allows the harness to be easily wrapped about the occupant and fastened.

It is an object of this invention to provide an adjustable buckle for over-the-shoulder safety harnesses which may be easily adjusted by the driver or passenger once it has been fastened into retaining position.

More particularly, it is an object of this invention to provide a device of the type described wherein initial buckling and later adjustment may all be made at one easily accessible location.

It is an object of this invention to provide a device of the type described wherein the fastening of the device, and thus the actual securing of the driver or rider, may be executed by joining only one tongue and its receiving buckle.

It is an object of this invention to provide a base plate for a device of the type described which is unitary in construction, thus affording maximum load bearing strength and maximum fabrication simplicity.

These and other objects of this invention will be clearly understood by reference to the following specification and accompanying drawings in which:

FIG. 1 is a plan view of the adjustable buckle showing fragmentary sections of the shoulder strap and seat belt affixed thereto;

FIG. 2 is a plan view identical to that shown in FIG. 1 with the exception that the cover has been removed from the buckle;

FIG. 3 is a cross-sectional view taken along plane III—III of FIG. 1;

FIG. 4 is a fragmentary side-elevational view of the buckle assembly indicating the manner in which the cover mates with and engages the base plate;

FIG. 5 is an enlarged cross-sectional view taken along plane V—V of FIG. 4; and

FIG. 6 is a perspective view illustrating the manner in which the adjustable buckle of this invention is utilized to secure an occupant to the vehicle frame.

Briefly, this invention comprises an integral base plate having means for engaging a buckle, means for adjustably engaging a seat belt, and means for adjustably engaging a shoulder strap. The buckle engaging means and belt engaging means are aligned such that webbing extending therefrom may pass around the rider in belt-like fashion. The shoulder strap engaging means is positioned transverse with respect to the buckle and seat belt engaging means such that its webbing may extend therefrom over the rider's shoulder. The seat belt and shoulder strap are adjustably mounted to the base plate by the utilization of elongated bars positioned on one side of rectangular openings therein. The belt and strap are looped through their respective openings to embrace the bar which is positioned by means of a plurality of lateral extensions at the extremities thereof.

Referring now to the figures, a preferred embodiment of this invention will be described in detail. From FIGS. 1 through 5 it will be seen that the fastening device which is the subject of this invention consists of a base plate 10 having a shoulder strap receiving opening 11, a seat belt receiving opening 12 and a buckle engaging tongue 13 formed integrally therewith. Tongue 13 is conventional in construction and has a pair of buckle engaging apertures 14 in the face thereof. Suitable buckles for engaging this type of tongue are well-known in the art and it is not necessary to discuss them in detail. A pair of opposed upstanding flanges 15 and a single upstanding flange 16 structurally complete base plate 10.

As will be seen by reference to FIGS. 1 and 2, the seat belt receiving opening 12 and the buckle engaging tongue 13 are aligned in such a manner that their respective webbings, when secured thereto, form a straight line across the plate. The shoulder strap receiving openings extends at a 20° to 30° angle to the centerline of the lap-type seat belt.

In effect, the base and cover plates together form a shallow, low silhouette interval chamber with a first straight passageway therethrough at one end for the lap-type belt and a second straight passageway for the shoulder strap. The second passageway is at an acute angle to the first passageway and communicates with it within the chamber.

Both shoulder strap 26 and seat belt 24 are adjustably mounted to base plate 10 by means of identical retaining bars 20. Each retaining bar has an elongated body section 21 having opposite lateral extensions 22 and 23 at the extremities thereof. As viewed best in FIGS. 2 and 3, the opposite lateral extensions 22 and 23 extend outward beyond their respective openings and bear directly against the adjacent inner face of base plate 10. The webbings are adjustably secured at their respective openings by forming a loop in them, passing the loop through the opening and inserting one of the retaining bars 20 within the loop such that, when pulled snug, the loop embraces the bar between the lateral extensions thereof. Opposed upstanding flanges 15, when cover plate 30 is in place, restrict the angular displacement of the retaining bar 20 associated with shoulder strap 26. Similarly, upstanding flange 16 restricts the angular displacement of retaining bar 20 associated with seat belt 24.

The assembly is decoratively and functionally completed by the addition of cover plate 30 which preferably has a decorative finish on its exposed surface. Cover 30 is shaped identically to base plate 10 with the exception that it does not extend over tongue 13. It has a plurality of depending flanges 31 which are positioned in mirror-image relationship to flanges 15 and 16 on base plate 10. Depending flanges 31 fit between upstanding flanges 15 and 16 on base plate 10 and are retained in that position by a plurality of conventional tab and slot arrangements 32 as indicated in FIGS. 3, 4, and 5. Cover 30 is functional in the sense that it prevents retaining bars 20 when the straps are slack from escaping the surface of base plate 10 a sufficient distance to rotate and thus slide into the loop of their respective webbings and out one of the openings. When the straps are taut. The cover plate serves no structural function.

Near the opening 12 for the secured portion of the lap-type belt, both the base plate 10 and the cover plate 30 have an arcuate cutout 40. This facilitates angular manipulation of the anchor device on the end of the belt section 24.

The adjustable mounting device itself, consisting merely of a rectangular aperture and a bar is well-known in the art. The length of the webbing extending therefrom may be adjusted by merely tilting the device to lengthen and pulling the loose end to tighten or shorten the belt. Under tension, retaining bars 20 slide toward and over the edges of their respective openings and thus prevent slippage of the loop by clamping it between elongated section 21 and the edge of the opening.

As shown in FIG. 6 in a typical installation, shoulder strap 26 and seat belt webbings 24 and 25 will be secured to the frame of the vehicle in a conventional manner. Seat belt webbing 24 and shoulder strap 26 are secured to each other by means of adjustable buckle 8 which is the subject of this invention. Once the driver or rider has taken his position, it is necessary only to place his arm through the loop formed by the strap 26 and belt section 24 and swing the assembly onto his shoulder. The locking connection is made in a conventional manner by snapping buckle 27 which is attached to seat belt section 25 onto buckle engaging tongue 13. Should any adjustment be necessary, shoulder strap 26 may be lengthened or shortened by pulling the loose end of the belt to tighten or shorten or by tilting the assembly approximately 45° so that the belt will slip around bar 21. Adjustment of the seat belt is made in a similar manner. In the event of an impact, the forward inertia of the secured person's body is absorbed by webbings 24, 25, and 26 and transmitted to the frame of the vehicle. The construction is such that the deceleration forces are distributed over a relatively large area of the secured person's body, thus eliminating localized excessive pressure which often cause serious bodily injury. The person's head and shoulders are prevented from being thrown forward by shoulder strap 26, thus preventing their collision with the interior of the vehicle.

Thus it will be seen that this invention has provided a safety harness buckling arrangement which renders relatively simple the utilization of the shoulder strap in conjunction with the seat belt type of harness, and thus affords a far greater degree of safety than can be gained by utilizing a seat belt only. It provides a single anchor for both the shoulder and lap straps, thus reducing both the weight and bulk of the attachment mechanism. It locates the adjustment means for both belts at a single, readily accessible point. It makes both easy to manipulate. Further, its construction is adapted to low-cost mass production while meeting acceptance strength requirements for impact conditions. Further, the construction provides a device of minimal thickness which also contributes to its lack of weight and mass. This is important in encouraging the use of this type of device. The device may be easily fastened and adjusted by the particular person being secured, thus adding to the insurance that it will be used constantly when the vehicle is in motion.

While a preferred embodiment of this invention has been described in detail, it will be apparent to those skilled in the art that a number of modifications thereof may be executed without departing from the spirit and scope of this invention. Such modifications are to be deemed as included within the scope of the appended claims unless these claims, by their language, expressly state otherwise.

I claim:

1. An anchor plate for securing both lap and shoulder belts, said anchor plate comprising: a base plate and a cover plate interfitting therewith and together defining a low silhouette chamber therein: a first straight passageway extending through said chamber adjacent one end thereof and opening through opposite sides of said chamber, said base plate having an integral buckle engaging keeper plate extending therefrom beyond said cover plate at one end of said first passageway: both said base plate and said cover plate having cutaway portions at the other end of said first passageway with the edges of said cutaway portions being inclined at an angle to the centerline of said passageway, said base and cover plates forming a shoulder strap receiving opening at the other end of said chamber communicating with said first passageway by a second straight passageway through said chamber, said second passageway having its centerline at an angle to said first passageway, said inclination of said edges of said cutaway being inclined toward the centerline of said second passageway and away from said opening: movable belt anchoring means mounted in each of said passageways for adjustably securing both a shoulder belt and a lap-type belt to said anchor plate, said base plate having a plurality of upstanding flanges and said cover having a plurality of depending flanges adapted to engage said upstanding flanges, said flanges confining said movable belt anchoring means within a restricted area when said cover plate is in engaging relationship with said upstanding flanges.

2. An anchor structure for an over-the-shoulder safety belt comprising:

a base plate panel having a plurality of upstanding flanges and having integrally formed therewith a buckle engaging keeper plate, said panel having a pair of elongated rectangular openings therein, one of said openings being disposed generally perpendicular to the reach of said keeper plate and the other of said openings being disposed at an angle thereto, said one opening being adapted to receive a lap belt looped therethrough and the other of said openings being adapted to receive a shoulder belt looped therethrough;

means cooperating with each of said openings for adjustably retaining said seat and lap belts; and a cover plate having a plurality of depending flanges engageable with the upstanding flanges on said panel, said retaining means being sandwiched between said cover plate and said panel, said flanges confining said retaining means within a restricted area when said cover plate and panel are interengaged.

3. The structure as set forth in claim 2 wherein each of said retaining means comprises an elongated bar adapted to span said openings passing through the loops in said belts, said bars having lateral extensions at each extremity thereof.

References Cited

UNITED STATES PATENTS

| | | | |
|---|---|---|---|
| 1,548,023 | 8/1925 | Cowell | 24—230.1 |
| 2,442,119 | 5/1948 | Drozinski | 24—73.05 |
| 2,896,284 | 7/1959 | Bishaf | 24—230.1 |
| 3,214,814 | 11/1965 | Carter et al. | 24—196 |
| 3,233,941 | 2/1966 | Selzer | 24—230.1 |

OTHELL M. SIMPSON, *Primary Examiner.*

WILLIAM FELDMAN, *Examiner.*

GIL WEIDENFELD, *Assistant Examiner.*